No. 671,929. Patented Apr. 9, 1901.
C. F. HORGAN.
RUBBER DAM FOR DENTISTS.
(Application filed Oct. 27, 1900.)
(No Model.)

Witnesses:-
Louis H. V. Whitehead.
Herman E. Metius.

Inventor:
Cornelius F. Horgan.
by his Attorneys:-
Howson & Howson

THE NORRIS PETERS CO., PHOTO-LITHO., WASHINGTON, D. C.

UNITED STATES PATENT OFFICE.

CORNELIUS F. HORGAN, OF PHILADELPHIA, PENNSYLVANIA, ASSIGNOR TO EDWARD HORGAN, OF SAME PLACE.

RUBBER DAM FOR DENTISTS.

SPECIFICATION forming part of Letters Patent No. 671,929, dated April 9, 1901.

Application filed October 27, 1900. Serial No. 34,662. (No model.)

*To all whom it may concern:*

Be it known that I, CORNELIUS F. HORGAN, a citizen of the United States, residing in Philadelphia, Pennsylvania, have invented certain Improvements in Rubber Dams for Dentists' Use, of which the following is a specification.

The object of my invention is to provide dentists with rubber-dam material which will be much less expensive than that at present used, and a further object is to utilize the dam as a means of illuminating the interior of the mouth. These objects I attain in the manner hereinafter set forth, reference being had to the accompanying drawings, in which—

Figure 1:
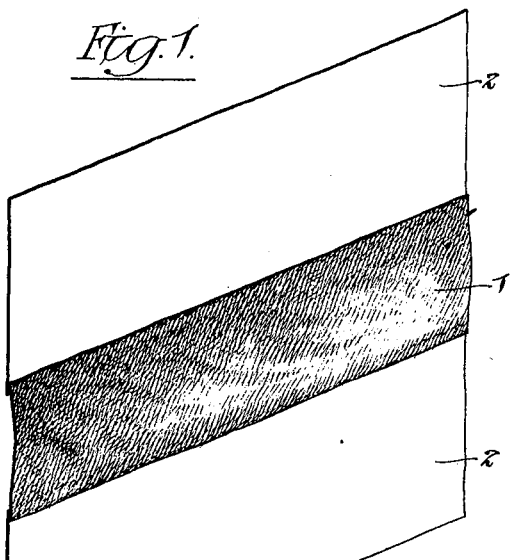
Figure 2:
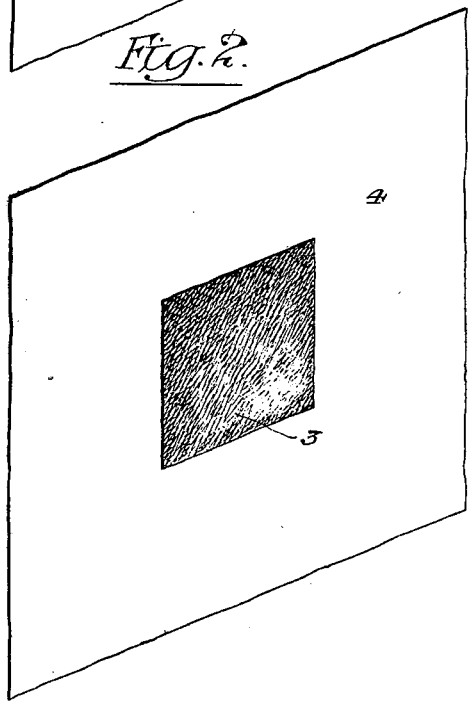

Figure 1 is a perspective view of a rubber dam made in accordance with my invention; and Fig. 2 is a similar view, illustrating another method of carrying out my invention.

Rubber dams such as are employed in dental work consist usually of sheets of pure rubber, each about five inches square, and they are comparatively expensive, as they cannot, for hygienic reasons, be used more than once. In order, therefore, to provide a rubber dam which, while cheaper, will be as effective as or even more effective than the ordinary dam, I use but a narrow strip of the sheet-rubber—say from three-quarters of an inch to an inch in width and of a length determined by the size of the dam to be produced, such strip being represented, for instance, at 1 in Fig. 1—and I secure to each edge of this narrow rubber strip flaps 2 of less expensive waterproof material—such, for instance, as rubber mixed with other materials or rubber-coated textile fabric similar to that employed in the manufacture of various kinds of waterproof articles of apparel.

The rubber strip 1, being elastic in both directions, can be applied to a hook with the same facility as a dam composed wholly of sheet-rubber, and the waterproof flaps 2 are equally as effective as the sheet-rubber in preventing the access of saliva to that portion of the tooth upon which the work is being performed. Further than this, I may make the flaps 2 of white or light colored material, so that they will serve to reflect light and illuminate the interior of the mouth, thereby in many cases enabling the dental operation to be conducted with greater facility and accuracy than is possible when the ordinary rubber dam is employed, for pure sheet-rubber is dark in color, and therefore possesses no such light-reflecting properties as the flaps 2 of my improved dam.

As the area of pure sheet-rubber employed in my improved dam is but about one-fifth that of the ordinary rubber dam, and as the material of which the flaps 2 are composed is much less expensive than the pure sheet-rubber, it will be evident that my improved rubber dam is much cheaper than one composed wholly of sheet-rubber, while at the same time it possesses the advantage of being a light-reflector, and is therefore superior to the ordinary rubber dam in this respect.

While in all cases I prefer to make the rubber strip 1 of a length equal to the full width of the dam in order that said rubber strip may be freely elastic in all directions, my invention may be embodied in a dam such as shown in Fig. 2, in which a square of rubber 3 of limited dimensions confined to the central portion of the dam is used in place of the long strip of rubber 1, the waterproof material 4 having a central opening for the reception of the rubber sheet, so as to completely surround the latter.

I am aware that a strip of sheet-rubber for application to a tooth has been combined with an apron of waterproof material secured to one edge of said strip and intended to prevent the soiling of the clothing of the patient by saliva; but the purpose of my invention is distinct from this, the waterproof flaps being applied to both edges of the rubber strip, so that the dam may surround the tooth equally on all sides.

Having thus described my invention, I claim and desire to secure by Letters Patent—

1. A rubber dam for dentists consisting of a central body portion of elastic sheet-rubber and of a size to receive the tooth, said rubber body portion being flanked by flexible waterproof flaps of other material, substantially as specified.

2. A rubber dam for dentists consisting of a central body portion of elastic sheet-rubber and of a size to receive the tooth, said rubber body portion being flanked by waterproof flaps of other material, and having a surface which will reflect the light, substantially as specified.

In testimony whereof I have signed my name to this specification in the presence of two subscribing witnesses.

CORNELIUS F. HORGAN.

Witnesses:
F. E. BECHTOLD,
JOS. H. KLEIN.